US005720996A

United States Patent [19]

Caprio et al.

[11] Patent Number: 5,720,996

[45] Date of Patent: Feb. 24, 1998

[54] FEEDING ACTIVATOR IN RAINBOW TROUT AND OTHER SALMONIDS

[75] Inventors: John T. Caprio, Baton Rouge, La.; Tine Valentinčič, Ljubljana, Slovenia; Jun Kohbara, Tsu, Japan

[73] Assignee: The Board of Supervisors of Louisiana State University and Agricultural and Mechanical College, Baton Rouge, La.

[21] Appl. No.: 567,141

[22] Filed: Dec. 4, 1995

[51] Int. Cl.⁶ .......... A01K 85/00

[52] U.S. Cl. .......... 426/1; 426/2; 424/84

[58] Field of Search .......... 426/1, 2; 424/84

[56] References Cited

U.S. PATENT DOCUMENTS

| | | | |
|---|---|---|---|
| 2,797,519 | 7/1957 | Keller | 43/42.06 |
| 2,874,048 | 2/1959 | Walldov | 99/3 |
| 2,979,778 | 8/1961 | FitzSimons | 18/58 |
| 4,245,420 | 1/1981 | Carr | 43/42.06 |
| 4,463,018 | 7/1984 | Carr | 426/1 |
| 4,530,179 | 7/1985 | Larew | 43/42 |
| 4,589,223 | 5/1986 | Hastings | 43/42.24 |
| 4,666,717 | 5/1987 | Smith et al. | 426/1 |
| 4,693,897 | 9/1987 | Johnsen et al. | 426/2 |
| 4,704,286 | 11/1987 | Rittschof et al. | 426/1 |
| 4,731,247 | 3/1988 | Wolford et al. | 426/1 |
| 4,752,480 | 6/1988 | Charbonnier et al. | 426/1 |
| 4,826,691 | 5/1989 | Prochnow | 426/1 |
| 4,887,376 | 12/1989 | Sibley et al. | 43/42.06 |
| 4,927,643 | 5/1990 | D'Orazio | 426/1 |
| 4,993,183 | 2/1991 | Carver | 43/42.06 |
| 5,071,659 | 12/1991 | Shumaker | 426/1 |
| 5,089,277 | 2/1992 | Prochnow | 426/1 |
| 5,171,587 | 12/1992 | Caprio et al. | 426/1 |
| 5,201,138 | 4/1993 | Watkins | 43/42.06 |

FOREIGN PATENT DOCUMENTS

| | | |
|---|---|---|
| 2561871 | 10/1985 | France . |
| WO 87/07476 | 12/1987 | WIPO . |

OTHER PUBLICATIONS

Ware, D. M., "Risk of Epibenthic Prey to Predation by Rainbow Trout (Salmo Gairdneri)", Journal Fisheries Research Boad of Canada, vol. 30, No. 6, pp. 787–797, 1973.

Bardach, J. E. et al., "Orientation by Taste in Fish of the Genus Ictalurus", Science, vol. 155, No. 3767, pp. 1276–1278, Mar. 1967.

Idler, D. R. et al., "Olfactory Perception in Migrating Salmon", J. Gen. Physiol. vol. 39, No. 6, pp. 889–892, 1956.

Hara T.J., Sveinsson, T., Evans, R.E., and Klaprat, D.A., Morphological and Functional Characteristics of the Olfactory and Gustatory Organs of Three Salvelinus Species, Can.J.Zool. (1993) 71: 414 –23.

Hara, T.J., Kitada, Y., and Evans, R.E., Gustatory Responses to Amino Acids in Salmonids: Phylogenetic Considerations, Pub.In: Olfaction and Taste XI (K. Kurihara, N. Suzuki, and H. Ogawa, eds.) Springer–Verlag p.751 (1993).

Jones, K.A., The Palatability of Amino Acids and Related Compounds to Rainbow Trout, *Salmo gairdneri* Richardson, J.Fish.Biol. (1989) 34: 149–160.

Caprio, J.T., Dec. 6, 1994, Chemoreception in the Rainbow Trout, *Oncorhynchus mykiss*, Unpublished. (Report on experiments that led to this application.)

Marui, T., Evans, R.E., Zielinski, B.S., and Hara, T.J., Gustatory Responses of the Rainbow Trout (*Salmo gairdneri*) Palate to Amino Acids and Derivatives. J.Comp-.Physiol (1983) 153A: 423–433.

Jones, K.A., A Case for Taste, The Final Sense. The In–Fisherman, The Journal of Freshwater Fishing (1991) 101: 31–44.

Caprio, J.T., Olfaction and Taste in Fish. Pub. In: Comparative Physiology of Sensory Systems. Cambridge University Press. pp.257–283 (1984).

Hara, T., Law, Y.M.C., and Hobden, B.R., Comparison of the Olfactory Response to Amino Acids in Rainbow Trout, Brook Trout and Whitefish. Comp.Biochem.Physiol. (1973) 45A: 967–77.

Hara, T.J., Olfactory Responses to Amino Acids in Rainbow Trout, *Salmo gairdneri*. Comp.Biochem.Physiol. (1973) 44A: 407–16.

Hara, T.J., Further Studies on the Structure–Activity Relationships of Amino Acids in Fish Olfaction. Comp.Biochem.Physiol. (1977) 56A: 559–65.

Evans, R.E., Zielinski, B., and Hara, T.J., Development and Regeneration of the Olfactory Organ in Rainbow Trout. Pub.In. Chemoreception in Fishes. (T.J. Hara,ed.) Amsterdam Elsevier Scientific Pub. Co. pp. 15–37. (1982).

Olsen, H., Chemoreceptive Behaviour in Arctic Charr, *Salvelinus alpinus* (L.): Emission Rate of Amino Acids and Ammonia and Their Role in Olfactory Preference of Juvenile Charr, *Salvelinus alpinus* (L.) Uppsala. (1985).

Olsen, H., Chemoreceptive Behaviour in Arctic Charr, *Salvelinus alpinus* (L.): Participating Effects of Nitrogenous Excretory Products in Conspecific Chemoattraction of Arctic Charr, *Salvelinus alpinus* (L.) Uppsala. (1985).

(List continued on next page.)

*Primary Examiner*—Milton Cano
*Attorney, Agent, or Firm*—Roy, Kiesel & Tucker

[57] ABSTRACT

An agent and method for inducing food search behavior in rainbow trout and other salmonids is disclosed. The agent comprises an amino acid selected from the group consisting of L-proline, L-leucine and L-alanine and combinations thereof. The agent may be applied to or incorporated within lures or fish food. When the lure or food particles are immersed in water, the agent will disperse into the water and rainbow trout and other salmonids close enough to detect the agent will be stimulated to search for food, making it more likely that the lure or food particle will be taken by the fish.

42 Claims, No Drawings

OTHER PUBLICATIONS

Marui, T.J., Harada, S. and Kasahara, Y., Gustatory Specificity for Amino Acids in the Facial System of the Carp, *Cyprinus carpio* L. J.Comp.Physiol. (1983) 153: 299–308.

Hidaka, I., Ohsugi, T., and Yamamoto, Y., Gustatory Response in the Young Yellowtail, *Seriola quinqueradiata*. Bulletin of the Japanese Society of Scientific Fisheries. (1985). 51(1): 21–24.

Hidaka, I., and Ishida, Y., Gustatory Response in the Shimaisaki (Tigerfish), *Therapon oxyrhynchus*. Bulletin of the Japanese Society of Fisheries. (1985). 51(3): 387–91.

Ishida, Y., and Hidaka, I., Gustatory Response Profiles for Amino Acids, Glycine, Betaine, and Nucleotides in Several Marine Teleosts. Nippon Suisan Gakkaishi. (1987). 53(8): 1391–98.

Adron, J.W., and Mackie, A.M., Studies on the Chemical Nature of Feeding Stimulants for Rainbow Trout, *Salmo gairdneri* Richardson. J.Fish.Biol. (1978). 12: 303–10.

Jones, K.A., Food Search Behavior in Fish and the Use of Chemical Lures in Commercial and Sports Fishing. Pub.In. Fish Chemoreception. (T.J. Hara, ed.) Chapman & Hall.

Shparkovsky, I.A., Pavlov, I.D., Troshicheva, N.V., and Klets, D.V., Response of Pink Salmon, *Oncorhynchus gorbuscha*, and Atlantic Salmon, *Salmo salar*, to Amino Acids During Spawning Migration. J.Ichthyol. (1981) 21: 135–140.

Jones, K.A., Chemical Requirements of Feeding in Rainbow Trout, *Oncorhynchus mykiss* (Walbaum); Palatability Studies on Amino Acids, Amides, Amines, Alcohols, Aldehydes, Saccharides, and Other Compounds. J. Fish Biol. (1990) 37: 413–23.

Hara, T.J., Electrical Responses of the Olfactory Bulb of the Pacific Salmon *Oncorhynchus kisutch*. J.Fish Res.Bd.Can. (1972) 29: 1351–55.

Mearns, K.J., Ellingsen, O.F., Døving, K.B., and Helmer, S., Feeding Behaviour in Adult Rainbow Trout and Atlantic Salmon Parr, Elicited by Chemical Fractions and Mixtures of Compounds Identified In Shrimp Extract. Aquaculture. (1987) 64: 47–63.

Mearns, K.J., Response of Atlantic Salmon (*Salmo salar* L.) Yearlings to Individual l–Amino Acis. Aquaculture. (1985). 48: 253–59.

Mearns, K.J., Behavioural Responses of Salmonid Fry to Low Amino Acid Concentrations. J.Fish Biol. (1989) 34: 223–232.

Ward, N.E., Chemoattractants for Trout and Salmon. Feed Management. (1991). 42(3): 6–10.

Mearns, K.J., Sensitivity of Brown Trout (*Salmo trutta* L.) And Atlantic Salmon (*Salmo salar* L.)Fry to Amino Acids at the Start of Exogenous Feeding. Aquaculture. (1986). 55: 191–200.

FEEDING ACTIVATOR IN RAINBOW TROUT AND OTHER SALMONIDS

BACKGROUND OF THE INVENTION

1. Field of the Invention

This invention relates generally to a chemical agent used to incite feeding activity in rainbow trout and other freshwater salmonids as well as to baits and foods for rainbow trout and other freshwater salmonids that use the agent to stimulate feeding activity.

2. Prior Art

Work in the field of chemical sensitivity in fish has shown electrophysiologically that rainbow trout and other salmonids are chemically sensitive to certain amino acids including, among others, L-proline, L-leucine, L-alanine, betaine, L-phenylalanine and L-α-amino-β-guanidino-propionic acid (hereinafter, L-AGPA). Hara, T., Kitada, Y., Evans, R. E., "Gustatory Responses to Amino Acids in Salmonids: Phylogenetic Considerations," in: *Olfaction and Taste XI* (Kurihara, K., Suzuki, N., Ogawa, H. eds.) Springer-Veralg, New York, p. 751 (1993). It has also been shown behaviorally that rainbow trout find L-proline, L-leucine and L-phenylalanine palatable at concentrations of $1\times10^{-2}$M. Jones, K. A., J. Fish Biol. 34: 149–160 (1989). Jones treated cotton pellets with the chemicals in question and fed them to the fish. By comparing the time the rainbow trout retained those pellets to the time they retained pellets treated with water only, he was able to determine which chemicals were palatable to the rainbow trout. Significantly, Jones' study illustrates the difference between sensitivity and palatability. Work in the field has demonstrated that rainbow trout are sensitive to L-alanine and betaine. Marui, T., et al., J. Comp. Physiol. 153A: 423–433 (1983). However, Jones shows that rainbow trout do not find those chemicals tasteful. This dichotomy illustrates the unsurprising result that knowledge of which substances create a response in an animal's taste nerves is not necessarily an indicator of which substances the animal will find tasteful and which it will find distasteful. Rather, sensitivity is merely an indication of which substances the animal can taste or smell at all.

Jones also disclosed that rainbow trout are strong visual feeders, using sight to determine what and when to strike. What is not known is which chemicals, if any, cause rainbow trout to search for food. Therefore, what is desired is a chemical agent capable of stimulating food search behavior in rainbow trout and lures and foods that make use of that agent.

OBJECTS OF THE INVENTION

It is an object of the invention to provide an agent for inducing food search behavior in rainbow trout and other salmonids.

It is another object of the invention to provide an artificial lure capable of inducing food search behavior in rainbow trout and other salmonids.

It is yet another object of the invention to provide a fish food capable of inducing food search behavior in rainbow trout and other salmonids.

It is still another object of the invention to provide a fish medicine capable of inducing food search behavior in rainbow trout and other salmonids.

SUMMARY OF THE INVENTION

Several chemicals have been discovered to cause rainbow trout to display food search behavior. These chemicals are L-proline, L-leucine and L-alanine. The effect of the chemicals on rainbow trout was tested by injecting the chemicals into aquaria housing individual trout. As a control, sometimes only water was injected into the tanks. Other times the chemical solutions were injected. The response of the rainbow trout to the chemicals was compared to their behavior in response to the controls. The chemicals selected were those that caused a significant change in the behavior of the trout compared to their behavior when only control water was added to the tank.

The chemicals caused the rainbow trout to exhibit two characteristics that indicated increased food search behavior. The rainbow trout snapped and bit at the water containing the chemicals. These snaps and bites were recorded. Swimming activity also increased. The number of turns greater than ninety degrees were also recorded. All activity was recorded only for the first ninety seconds after the introduction of either the chemicals or the controls.

What is desired is an agent that will make rainbow trout and other salmonids exhibit this food search behavior in the vicinity of a lure or fly or fish food pellet. Therefore, the invention is comprised of an agent made of one or more of these chemicals. This agent may be sprayed or otherwise applied to the surface of a lure or to fish food. Alternatively, the lure or fish food may be manufactured with the agent already incorporated in it. In either case, what is desired is that the agent will be dispersed into the water when the lure or fish food or portion thereof is submerged. Rainbow trout and other salmonids that come into contact with the agent will begin exhibiting food search behavior. This will make them more likely to encounter the lure or food pellet and also more likely to strike or ingest it, ultimately making the fish easier to catch or feed as the case may be.

DESCRIPTION OF THE INVENTION

The inventors tested the sensitivity of the rainbow trout's glossopharyngeal and facial taste systems (cranial nerves IX and VII, respectively) to various amino acids. This was done in a substantially similar fashion to the tests performed by Marui, et al., (1983); however, where Marui only tested sensitivity of the facial system to these chemicals, the inventor tested the sensitivity of both the facial and the glossopharyngeal taste systems. The inventors' tests revealed that the taste nerves of rainbow trout show a high level of responsiveness to L-AGPA, D-proline, L-proline, L-leucine, L-phenylalanine, betaine and glycine at concentrations of $1\times10^{-2}$M. Interestingly, the rainbow trout did not exhibit significant sensitivity to L-alanine. As the concentration was decreased to $1\times10^{-3}$M, only L-AGPA and L-proline induced a strong response. The rainbow trout were able to detect L-proline at concentrations as low as $1\times10^{-6}$ to $10^{-7}$M. Although the rainbow trout never showed a strong response to L-alanine, they continued to be able to detect its presence at concentrations as low as $1\times10^{-5}$ to $10^{-6}$M, making L-alanine second only to L-proline in low concentration detectability.

After having determined the relative sensitivity of the glossopharyngeal and facial taste systems of the rainbow trout to the various amino acids across a range of concentrations, the inventors focused their attention on the ability of the acids to induce food search behavior in rainbow trout. They isolated individual rainbow trout in tanks and injected test chemicals into their tanks. The test subjects were monitored for food search behavior which was defined as turns of greater than ninety degrees and biting and snapping at the transparent chemicals in the water. Snapping was defined as exaggerated biting. Responses of the trout were recorded only for the first ninety seconds after the chemicals or controls were introduced.

The test chemicals were injected into the tanks at two different concentrations, $1\times10^{-1}$M and $1\times10^{-2}$M. This resulted in concentrations at the point of contact with the fish ranging from $3\times10^{-4}$ to $3\times10^{-5}$M in the former case and $3\times10^{-5}$ to $3\times10^{-6}$M in the latter. Of the chemicals tested, only L-proline, L-alanine and L-leucine produced significant effects in both turns and in bites at both concentrations. It is anticipated that other salmonids will react to these chemicals in a substantially similar fashion given the broad range of salmonids that are chemically sensitive to them. Hara, T., Kitada, Y., Evans, R. E., "Gustatory Responses to Amino Acids in Salmonids: Phylogenetic Considerations," in: *Olfaction and Taste XI* (Kurihara, K., Suzuki, N., Ogawa, H. eds.) Springer-Veralg, New York, p. 751 (1993).

The threshold sensitivities of rainbow trout for detection of each of these chemicals are $1\times10^{-7}$–$10^{-6}$M for L-proline, $1\times10^{-6}10^{-5}$M for L-alanine and $1\times10^{-4}$–$10^{-3}$M or L-leucine. The solubilities of the chemicals in water at 25° C. in grams/100 ml are 162 for L-proline, 16.65 for L-alanine, and 2.43 for L-leucine.

Therefore, what is disclosed is an agent for inducing food search behavior in rainbow trout and other salmonids. The agent will comprise an amino acid selected from the group L-proline, L-leucine and L-alanine and combinations thereof. In one preferred embodiment, the agent will comprise a mixture of L-proline and L-leucine. In another preferred embodiment, the agent will comprise a mixture of L-proline and L-alanine. In another preferred embodiment, the agent will comprise a mixture of L-leucine and L-alanine. In another preferred embodiment, the agent will comprise a mixture of L-proline, L-alanine and L-leucine. In another preferred embodiment, the agent will comprise L-proline. In yet another preferred embodiment, the agent will comprise L-alanine. In still another preferred embodiment, the agent will comprise L-leucine.

It is anticipated that such an agent may be incorporated into the body part of a fishing lure or fly by applying the agent to the surface of the body part or by impregnating the body part with the agent. The lure or fly may then be used to catch rainbow trout and other salmonids. Alternatively, lures and flies may be sold having already been impregnated with the agent. When the agent is incorporated into the lure or fly, the body part should be porous to allow the agent to disseminate into the water when the lure is immersed. When a fly or floating lure or any other floating object such as fish food or fish medicine is used, immersion should be read to include only a portion, perhaps a very small portion, of the body part being in contact with the water.

Another application of the invention would be to use the agent in or on food particles or medicines to be given to rainbow trout and other salmonids in order to increase food or medicine consumption in fisheries or fish farms. By coating the medicine with the agent, the fish farmer will be able to save money by ensuring that more of the medicine is actually found and consumed by the fish.

When the words "incorporated" or "incorporating" are used in the context of treating lures, foods, medicines or other objects with the agent in the claims of this application, "incorporated" should be read to include situations where the body of the treated object is impregnated with the agent; situations where the agent is applied to the surface of the object by spraying, dipping, painting or otherwise; and situations where the agent is both impregnated within the body of the object and applied to the object's surface.

It is also contemplated that large quantities of the agent might be injected into the water in order to attract rainbow trout and other salmonids to the area where the fisherman is located in much the same manner that saltwater fishermen chum for sharks. In chumming, the agent may be introduced into the water by submerging a porous container filled with the agent in the fishing area. Another method is to use large squirt type waterguns to lay long lines of agent on the water that lead back to the fisherman. Similarly, the fisherman may add large quantities of the agent to an area where he will east his lure.

The agent will be placed on or impregnated into an object that the fisherman or other person wishes the rainbow trout to bite. When that object is placed in the water, the agent will disperse into the water. Liquids, such as the agent, will disperse in the water much as smoke emanates from a cigarette or from a recently extinguished match. The dispersing agent will form irregularly shaped clouds and long streamers as it disseminates, creating dispersion patterns in the surrounding water. When rainbow trout come into contact with one or more of these clouds or streamers, the agent will induce food search behavior in the trout. Those rainbow trout will be more likely to strike or ingest the object as desired.

The size and dimensions of the area surrounding the lure or other treated object that will be affected by the agent will vary considerably. The direction the streamers take as they emanate from the object will be influenced by the current, if any, in the water. A streamer may split into two separate streamers as it disperses in the water, creating two lines of effectiveness in the water and simultaneously leaving an area between them where a trout, if present, would not detect the agent. The concentration of the agent in the streamers will generally decrease as one streamer moves further from the treated object. However, the rate that the concentration decreases will not be uniform. In some instances, the agent may be carried a significant distance by the prevailing currents and eddies without significant dispersion. In others, a cross current may catch a streamer relatively near the object and cause the agent to dissipate immediately. The pattern of dispersion will seldom be repeated.

The sensitivity of the taste systems of the rainbow trout or other salmonid will also be a limiting factor on the effectiveness of the agent. As discussed above, the concentration within each streamer generally decreases as one moves away from the treated object. At some distance, the concentration will drop below the rainbow trout's threshold of sensitivity for that particular chemical. Like a person too far away from the source of a sound, the trout past this threshold point will not be able to detect the chemical and will thus be unaffected by it. For our human listener, "too far" will depend on the amplitude in decibels, the frequency of the particular sound wave and ambient conditions such as wind direction, background noise and air temperature. So too, with the threshold point; the concentration of the agent in the streamer will vary with many factors. What the exact concentration within each streamer will be at any given point is impossible to predict. It will vary with the amount of agent with which the object is initially treated and the concentration of that agent before it is applied. The water solubility of the different amino acids that can comprise the agent will affect the concentration as will the temperature, purity and brackishness of the water. The composition of the object comprising the lure or food particle will affect how quickly it releases the agent, and of course, the longer the object is in the water, the lower the concentration will be.

The background concentration of amino acids in freshwater emanating from plants and other sources will also be a factor affecting the ability of the agent to stimulate food search behavior. Typical background concentrations of amino acids in freshwater range from about $1\times10^{-9}$ to $1\times10^{-7}$M. For the agent to be effective in stimulating feeding behavior, the concentration at the fish must be above the background concentration. However, the concentration at the fish will depend on the fish's distance from the source of the agent, the concentration of the agent at the source and the other factors discussed above.

There are, of course, alternate embodiments which are obvious from the foregoing description of the invention which are intended to be included within the scope of the invention as described by the following claims.

We claim:

1. A lure for rainbow trout and other salmonids comprising:

a body part, and an agent for inducing food search behavior in rainbow trout and other salmonids comprising an amino acid selected from the group consisting of L-proline, L-leucine and L-alanine and combinations thereof, said agent being incorporated in said body part to effect dispersion of said agent as said lure is immersed into water, whereby said agent will create dispersion patterns in said surrounding water, said dispersion patterns containing areas of concentration of said agent sufficient to elicit said food search behavior in said rainbow trout and other salmonids.

2. A lure for rainbow trout and other salmonids according to claim 1 wherein said dispersion patterns contain areas of concentration of L-proline of at least $1\times10^{-6}$M.

3. A lure for rainbow trout and other salmonids according to claim 1 wherein said dispersion patterns contain areas of concentration of L-alanine of at least $1\times10^{-5}$M.

4. A lure for rainbow trout and other salmonids according to claim 1 wherein said dispersion patterns contain areas of concentration of L-leucine of at least $1\times10^{-4}$M.

5. A lure for rainbow trout and other salmonids according to claim 1 wherein said dispersion patterns contain areas of concentration of L-leucine of at least $1\times10^{-3}$M.

6. A lure for rainbow trout and other salmonids comprising:

a body part, and an agent for inducing food search behavior in rainbow trout and other salmonids comprising L-leucine, said agent being incorporated in said body part to effect dispersion of said agent as said lure is immersed into water, whereby said agent will create dispersion patterns in said surrounding water, said dispersion patterns containing areas of concentration of said agent sufficient to elicit said food search behavior in said rainbow trout and other salmonids.

7. A lure for rainbow trout and other salmonids according to claim 6 wherein said dispersion patterns contain areas of concentration of at least $1\times10^{-4}$M.

8. A lure for rainbow trout and other salmonids according to claim 6 wherein said dispersion patterns contain areas of concentration of at least $1\times10^{-3}$M.

9. A fish food for rainbow trout and other salmonids comprising:

food particles, and an agent for inducing food search behavior in rainbow trout and other salmonids comprising an amino acid selected from the group consisting of L-proline, L-leucine and L-alanine and combinations thereof, said agent being incorporated in said food particles to effect dispersion of said agent as said food particles are immersed into water, whereby said agent will create dispersion patterns in said surrounding water, said dispersion patterns containing areas of concentration of said agent sufficient to elicit said food search behavior in said rainbow trout and other salmonids.

10. A fish food for rainbow trout and other salmonids according to claim 9 wherein said dispersion patterns contain areas of concentration of L-proline of at least $1\times10^{-6}$M.

11. A fish food for rainbow trout and other salmonids according to claim 9 wherein said dispersion patterns contain areas of concentration of L-alanine of at least $1\times10^{-5}$M.

12. A fish food for rainbow trout and other salmonids according to claim 9 wherein said dispersion patterns contain areas of concentration of L-leucine of at least $1\times10^{-4}$M.

13. A fish food for rainbow trout and other salmonids comprising:

food particles, and an agent for inducing food search behavior in rainbow trout and other salmonids comprising L-leucine, said agent being incorporated in said food particles to effect dispersion of said agent as said food particles are immersed into water, whereby said agent will create dispersion patterns in said surrounding water, said dispersion patterns containing areas of concentration of said agent sufficient to elicit said food search behavior in said rainbow trout and other salmonids.

14. A fish food for rainbow trout and other salmonids according to claim 13 wherein said dispersion patterns contain areas of concentration of at least $1\times10^{-3}$M.

15. A fish food for rainbow trout and other salmonids according to claim 13 wherein said dispersion patterns contain areas of concentration of at least $1\times10^{-4}$M.

16. A fish medicine for rainbow trout and other salmonids comprising:

medicine particles, and an agent for inducing food search behavior in rainbow trout and other salmonids comprising an amino acid selected from the group consisting of L-proline, L-leucine and L-alanine and combinations thereof, said agent being incorporated in said medicine particles to effect dispersion of said agent as said medicine particles are immersed into water, whereby said agent will create dispersion patterns in said surrounding water, said dispersion patterns containing areas of concentration of said agent sufficient to elicit said food search behavior in said rainbow trout and other salmonids.

17. A fish medicine for rainbow trout and other salmonids according to claim 16 wherein said dispersion patterns contain areas of concentration of L-proline of at least $1\times10^{-6}$M.

18. A fish medicine for rainbow trout and other salmonids according to claim 16 wherein said dispersion patterns contain areas of concentration of L-alanine of at least $1\times10^{-5}$M.

19. A fish medicine for rainbow trout and other salmonids according to claim 16 wherein said dispersion patterns contain areas of concentration of L-leucine of at least $1\times10^{-4}$M.

20. A fish medicine for rainbow trout and other salmonids comprising:

medicine particles, and an agent for inducing food search behavior in rainbow trout and other salmonids comprising L-leucine, said agent being incorporated in said medicine particles to effect dispersion of said agent as said medicine particles are immersed into water, whereby said agent will create dispersion patterns in said surrounding water, said dispersion patterns containing areas of concentration of said agent sufficient to elicit said food search behavior in said rainbow trout and other salmonids.

21. A fish medicine for rainbow trout and other salmonids according to claim 20 wherein said dispersion patterns contain areas of concentration of at least $1\times10^{-3}$M.

22. A fish medicine for rainbow trout and other salmonids according to claim 20 wherein said dispersion patterns contain areas of concentration of at least $1\times10^{-4}$M.

23. A method of inducing food search behavior in rainbow trout and other salmonids comprising:

incorporating an agent comprising an amino acid selected from the group consisting of L-proline, L-leucine and L-alanine and combinations thereof into a lure;

introducing said lure into water in the vicinity of said rainbow trout or said other salmonids; and dispersing said agent from said lure into the water to create dispersion patterns containing areas of concentration of said agent sufficient to elicit said food search behavior in said rainbow trout and other salmonids.

24. A method of inducing food search behavior in rainbow trout and other salmonids according to claim 23, wherein said dispersion patterns contain areas of concentration of L-proline of at least $1\times10^{-6}$M.

25. A method of inducing food search behavior in rainbow trout and other salmonids according to claim 23 wherein said dispersion patterns contain areas of concentration of L-alanine of at least $1\times10^{-5}$M.

26. A method of inducing food search behavior in rainbow trout and other salmonids according to claim 23 wherein said dispersion patterns contain areas of concentration of at least of L-leucine $1\times10^{-4}$M.

27. A method of inducing food search behavior in rainbow trout and other salmonids according to claim 23 wherein said dispersion patterns contain areas of concentration of L-leucine of at least $1\times10^{-3}$M.

28. A method of inducing food search behavior in rainbow trout and other salmonids comprising:

incorporating an agent comprising an amino acid selected from the group consisting of L-proline, L-leucine and L-alanine and combinations thereof into a fish food;

introducing said fish food into water in the vicinity of said rainbow trout or said other salmonids; and dispersing said agent from said fish food into the water to create dispersion patterns containing areas of concentration of said agent sufficient to elicit said food search behavior in said rainbow trout and other salmonids.

29. A method of inducing food search behavior in rainbow trout and other salmonids according to claim 28 wherein said dispersion patterns contain areas of concentration of L-proline of at least $1\times10^{-6}$M.

30. A method of inducing food search behavior in rainbow trout and other salmonids according to claim 28 wherein said dispersion patterns contain areas of concentration of L-alanine of at least $1\times10^{-5}$M.

31. A method of inducing food search behavior in rainbow trout and other salmonids according to claim 28 wherein said dispersion patterns contain areas of concentration of L-leucine of at least $1\times10^{-4}$M.

32. A method of inducing food search behavior in rainbow trout and other salmonids according to claim 28 wherein said dispersion patterns contain areas of concentration of L-leucine of at least $1\times10^{-3}$M.

33. A method of inducing food search behavior in rainbow trout and other salmonids comprising:

incorporating an agent comprising an amino acid selected from the group consisting of L-proline, L-leucine and L-alanine and combinations thereof into a fish medicine;

introducing said fish medicine into water in the vicinity of said rainbow trout or said other salmonids; and dispersing said agent from said fish medicine into the water to create dispersion patterns containing areas of concentration of said agent sufficient to elicit said food search behavior in said rainbow trout and other salmonids.

34. A method of inducing food search behavior in rainbow trout and other salmonids according to claim 33 wherein said dispersion patterns contain areas of concentration of L-proline of at least $1\times10^{-6}$M.

35. A method of inducing food search behavior in rainbow trout and other salmonids according to claim 33 wherein said dispersion patterns contain areas of concentration of L-alanine of at least $1\times10^{-5}$M.

36. A method of inducing food search behavior in rainbow trout and other salmonids according to claim 33 wherein said dispersion patterns contain areas of concentration of L-leucine of at least $1\times10^{-4}$M.

37. A method of inducing food search behavior in rainbow trout and other salmonids according to claim 33 wherein said dispersion patterns contain areas of concentration of L-leucine of at least $1\times10^{-3}$M.

38. A method of inducing food search behavior in rainbow trout and other salmonids comprising:

introducing an agent comprising an amino acid selected from the group consisting of L-proline, L-leucine and L-alanine and combinations thereof into water in the vicinity of said rainbow trout or said other salmonids; and dispersing said agent in the water to create dispersion patterns containing areas of concentration of said agent sufficient to elicit said food search behavior in said rainbow trout and other salmonids.

39. A method of inducing food search behavior in rainbow trout and other salmonids according to claim 38 wherein said dispersion patterns contain areas of concentration of L-proline of at least $1\times10^{-6}$M.

40. A method of inducing food search behavior in rainbow trout and other salmonids according to claim 38 wherein said dispersion patterns contain areas of concentration of L-alanine of at least $1\times10^{-5}$M.

41. A method of inducing food search behavior in rainbow trout and other salmonids according to claim 38 wherein said dispersion patterns contain areas of concentration of L-leucine of at least $1\times10^{-4}$M.

42. A method of inducing food search behavior in rainbow trout and other salmonids according to claim 38 wherein said dispersion patterns contain areas of concentration of L-leucine of at least $1\times10^{-3}$M.

* * * * *

UNITED STATES PATENT AND TRADEMARK OFFICE
CERTIFICATE OF CORRECTION

PATENT NO. : 5,720,996

DATED : February 24, 1998

INVENTOR(S) : John T. Caprio, Tine Valentincic, Jun Kohbara

It is certified that error appears in the above-identified patent and that said Letters Patent is hereby corrected as shown below:

Column 3, line 20, "or" should read --for--
Column 4, line 10, "east" should read --cast--

Signed and Sealed this

Twenty-third Day of June, 1998

Attest:

BRUCE LEHMAN

*Attesting Officer*

*Commissioner of Patents and Trademarks*